United States Patent
Chang et al.

(10) Patent No.: US 8,155,043 B2
(45) Date of Patent: Apr. 10, 2012

(54) WIRELESS COMMUNICATION RECEIVER, SYSTEM, AND METHOD FOR LOADING FIRMWARE

(75) Inventors: Chih-Peng Chang, Pan-Chiao (TW); Chi-Ming Chang, Chung-Li (TW)

(73) Assignee: MediaTek Inc., Hsinchu (TW)

( * ) Notice: Subject to any disclaimer, the term of this patent is extended or adjusted under 35 U.S.C. 154(b) by 1044 days.

(21) Appl. No.: 11/951,827

(22) Filed: Dec. 6, 2007

(65) Prior Publication Data
US 2009/0147716 A1    Jun. 11, 2009

(51) Int. Cl.
*H04H 20/71*    (2008.01)
(52) U.S. Cl. ........................................... 370/312
(58) Field of Classification Search .................... 370/312
See application file for complete search history.

(56) References Cited

U.S. PATENT DOCUMENTS

| | | | |
|---|---|---|---|
| 6,629,172 B1 * | 9/2003 | Andersson et al. | 710/104 |
| 6,931,468 B2 * | 8/2005 | Smith et al. | 710/104 |
| 2004/0128493 A1 * | 7/2004 | Zimmer et al. | 713/1 |
| 2005/0229173 A1 * | 10/2005 | Mihm et al. | 717/171 |

* cited by examiner

*Primary Examiner* — Jeffrey Pwu
*Assistant Examiner* — Farhad Ali
(74) *Attorney, Agent, or Firm* — Thomas, Kayden, Horstemeyer & Risley, LLP (57) ABSTRACT

A wireless communication system comprises a plurality of antennas, a plurality of tuners, a plurality of receiver ends, a bus, and a processor. Each of the tuners is connected to one of the antennas and one of the receiver ends. Each of the receiver ends has a corresponding address. A common address code is assigned to the corresponding addresses of part of receiver ends during firmware loading. The processor transmits the firmware to the part of the receiver ends via the bus based on the common address code. The corresponding addresses of the part of the receiver ends are converted back into unique address codes after the firmware is loaded.

18 Claims, 6 Drawing Sheets

WIRELESS COMMUNICATION RECEIVER, SYSTEM, AND METHOD FOR LOADING FIRMWARE

CROSS-REFERENCES TO RELATED APPLICATIONS

Not applicable.

BACKGROUND OF THE INVENTION

1. Field of the Invention

The present invention relates to a wireless communication receiver, a system, and a method for loading firmware.

2. Descriptions of the Related Art

Figure 1:
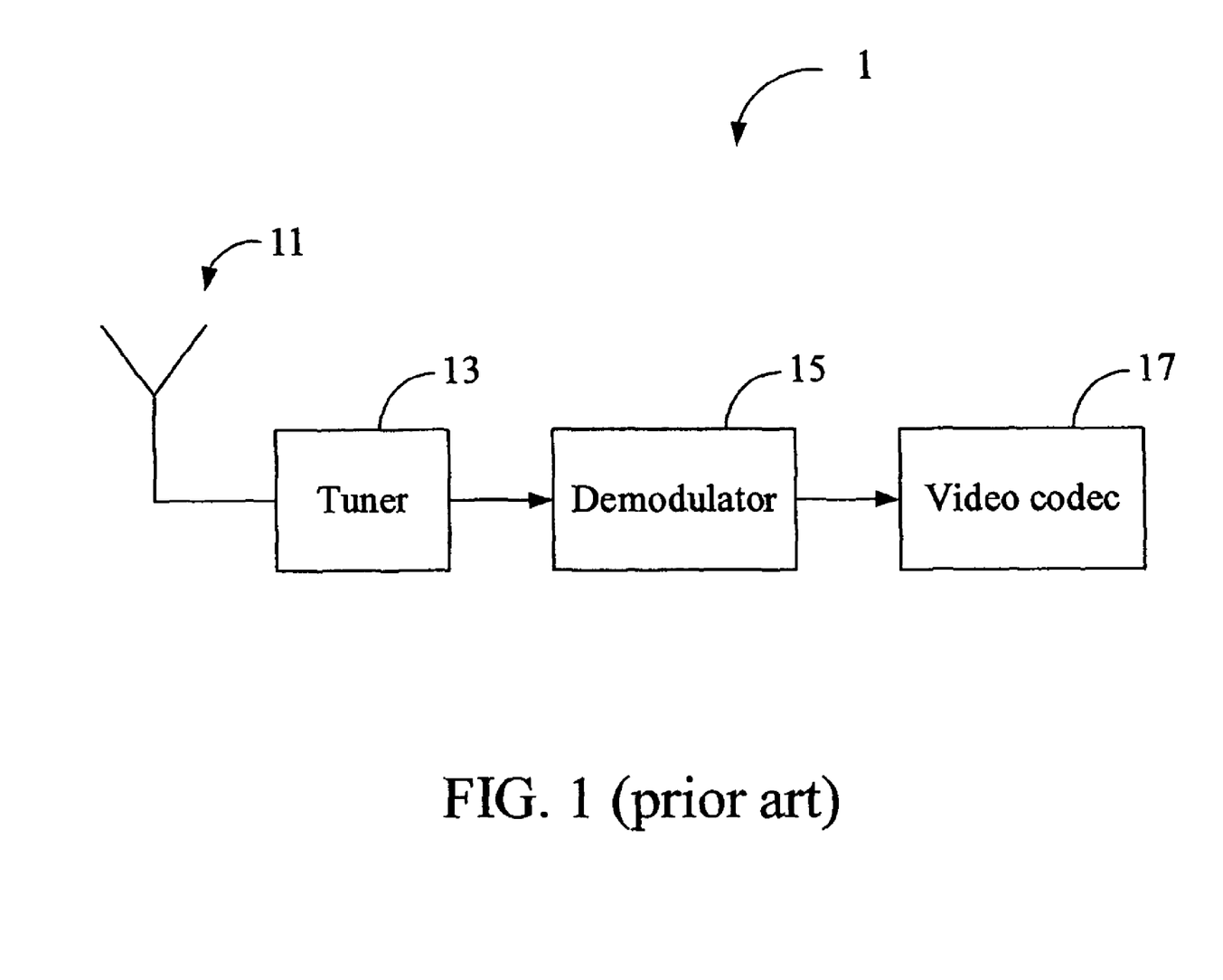
FIG. 1 is a schematic diagram of a conventional wireless communication system.

Wireless communication systems have been used in many fields, such as in transmissions of digital television programs and broadcast programs. As shown in FIG. 1, a wireless communication system 1 of the prior art comprises an antenna 11, a tuner 13, a demodulator 15, and a video codec 17. In this conventional wireless communication system 1, multimedia broadcasted through a wireless channel is received by the antenna 11, and then the tuner 13 amplifies and down converts the multimedia. The tuned multimedia is demodulated by the demodulator 15 and then decoded by the video codec 17.

Figure 2:
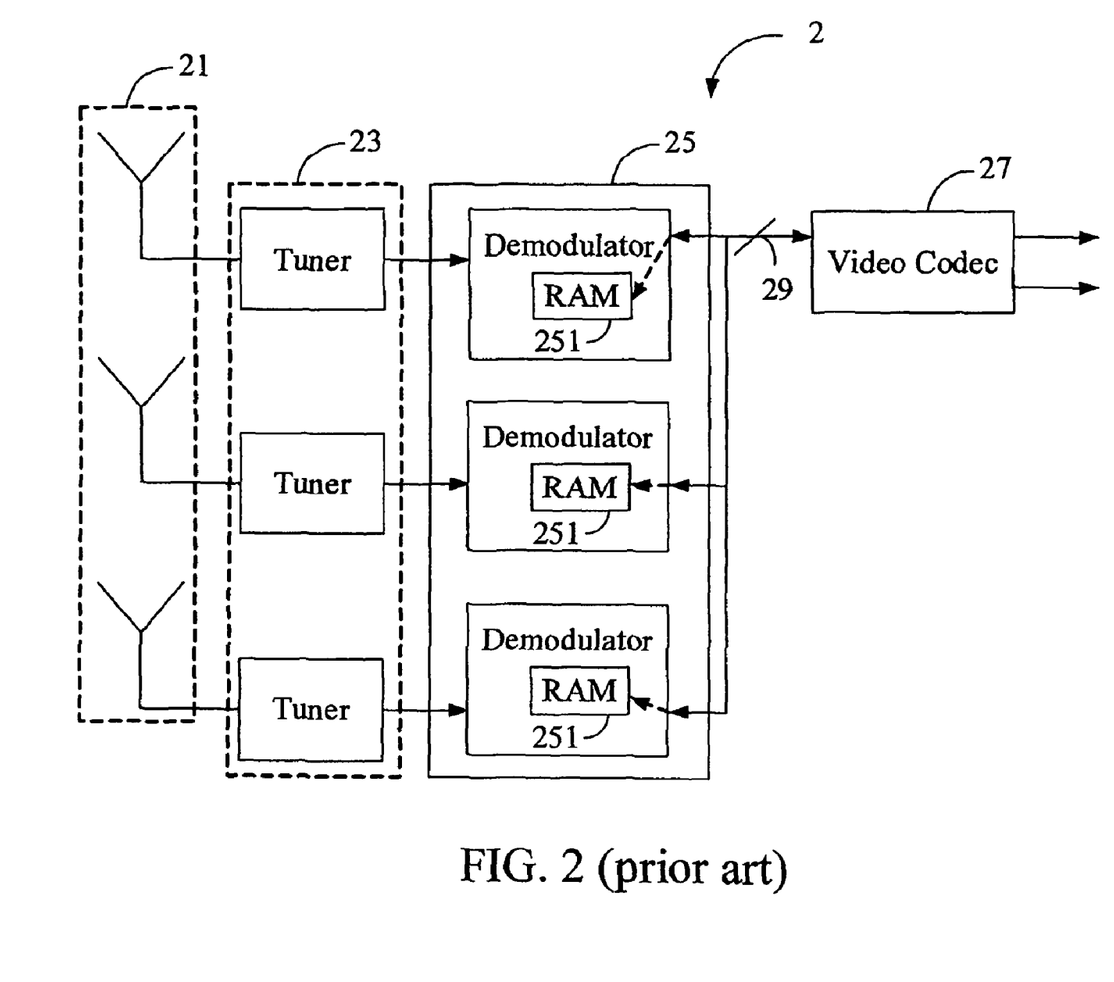
FIG. 2 is a schematic diagram of a conventional wireless communication system with multi-receiver ends.

Conventionally, in order to enhance the receiving quality, there is more than one antenna being used. As shown in FIG. 2, a wireless communication system 2 adapts more than one antenna to collect wireless multimedia signals from different directions. Each of the antennas 21 is connected to a corresponding tuner 23, which is coupled to a corresponding demodulator 25. The multimedia signals from different directions are transmitted to and processed by the tuners 23 and demodulators 25, and are then transmitted to the video codec 27, such as a MPEG processor, through, for example, an $I^2C$ bus.

A wireless communication system 2 with a plurality of antennas 21 and the demodulators 25 is required to embed the operational firmware before the system start to operate. In general, the demodulators 25 load the firmware from the video codec 27, and store it in RAMs 251 of the demodulators 25. More specifically, each of the demodulators 25 has its own address code. When data are transmitted through the bus, such as $I^2C$ bus, each of the demodulators 25 identifies the particular data if an address code attached to the data matches with its own address code. Since the $I^2C$ bus is a serial bus, the video codec 27 needs to transmit the firmware to the demodulators 25 one by one. As a result, the initialization time is intolerably long.

Thus, a wireless communication system with multi-receiver ends that is quicker at loading firmware is needed.

SUMMARY OF THE INVENTION

One objective of the invention is to provide a wireless communication receiver. The wireless communication receiver comprises a bus, a plurality of receiver ends, and a processor. Each receiver end has a corresponding address, with a common address code assigned to the corresponding addresses of at least part of the receiver ends during firmware loading. The processor transmits the firmware to the part of the receiver ends via the bus based on the common address code. The corresponding addresses of the part of the receiver ends are converted back into unique address codes after the firmware is loaded.

Another objective of the invention is to provide a method for loading firmware into a plurality of receiver ends. Each receiver end has a corresponding address. The method comprises the following steps: assigning a common address code to the corresponding addresses of the receiver ends; transmitting the firmware to the receiver ends via a bus based on the common address code; and converting the corresponding addresses back into unique address codes after the firmware is loaded.

A further objective of the invention is to provide a wireless communication system. The wireless communication system comprises a plurality of antennas, a plurality of tuners, a plurality of receiver ends, a bus, and a processor. Each of the tuners is connected to one of the antennas. Each of the receiver ends is connected to one of the tuners and has a corresponding address. A common address code is assigned to the corresponding addresses of at least part of the receiver ends during firmware loading. The processor transmits the firmware to the part of the receiver ends via the bus based on the common address code. The corresponding addresses of the part of the receiver ends are converted back into unique address codes after the firmware is loaded.

Yet a further objective of the invention is to provide a wireless communication receiver. The wireless communication receiver comprises (1) means for transferring data; (2) a plurality of receiving devices for receiving wireless signals, wherein each receiving devices has a corresponding address and a common address code is assigned to the corresponding addresses of at least part of the plurality of receiving devices when the part of the plurality of receiving devices needs to load firmware; and (3) means for transmitting the firmware to the part of the plurality of receiving devices via the transferring means based on the common address code. The corresponding addresses of the part of the plurality of receiving devices are converted back into unique address codes after the firmware is loaded.

The present invention is capable of saving time during firmware loading by setting a common address code to the addresses of the receiver ends.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3A:
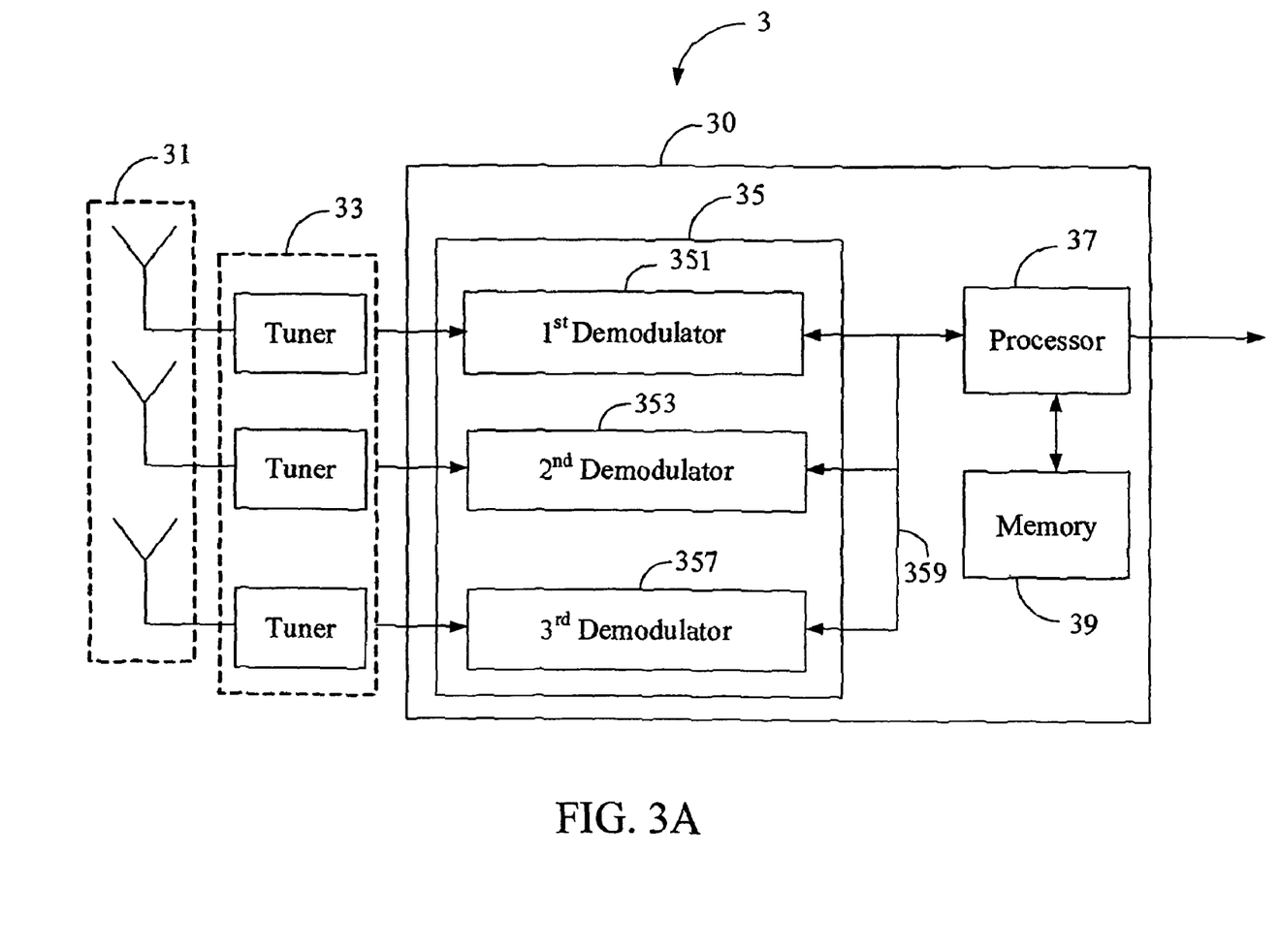
FIG. 3A is a schematic diagram of a first embodiment in accordance with the present invention.

A first embodiment of this invention is a wireless communication system 3 as shown in FIG. 3A. The wireless communication system 3 comprises a plurality of antennas 31, a plurality of tuners 33, and a wireless communication receiver 30. The wireless communication receiver 30 comprises a bus 359, a plurality of receiver ends in the form of demodulators 35, a processor 37, and a memory 39. For the purpose of simplicity, there are three antennas 31, three tuners 33, and three receiver ends 35 in the first exemplary embodiment. However, this is only for the purpose of illustration with no intention to limit the scope thereof. The three receiver ends 35 are demodulators, namely, a first demodulator 351, a second demodulator 353, and a third demodulator 357. Each of the tuners 33 is coupled to one of the antennas 31 and a corresponding demodulator. The bus 359 is a serial interface, such as an $I^2C$ bus, which is configured to transfer data between the demodulators 35 and the processor 37. Of course, the bus 359 could be implemented as a parallel interface for one of ordinary skill in the relevant filed. In this exemplary embodiment, the processor 37 is an MPEG decoder for decoding MPEG multimedia data. The memory 39 is a flash memory, which is configured to store the firmware.

Each of the demodulators 35 has an address. A unique address code is assigned to the address. When a demodulator, such as the first demodulator 351, is going to transmit data to the processor 37, the address code is attached to the data and the processor 37 can recognize that the data is sent by the first demodulator 351 during transmission. Similarly, the corresponding address code of the first demodulator 351 is attached to the data so that, the first demodulator 351 can recognize the data as its own while the processor 37 transmits data to the first demodulator 351. Consequently, other demodulators 353, 357 would not recognize this data since the corresponding address codes for other demodulators are different from the first demodulator 351.

Prior the operation of the system 3, each of the demodulators 35 requires firmware being installed. Therefore, loading the firmware into the demodulators 35 are executed during the initialization period. The detail of how to process of firmware loading is describes as following.

Figure 3B:
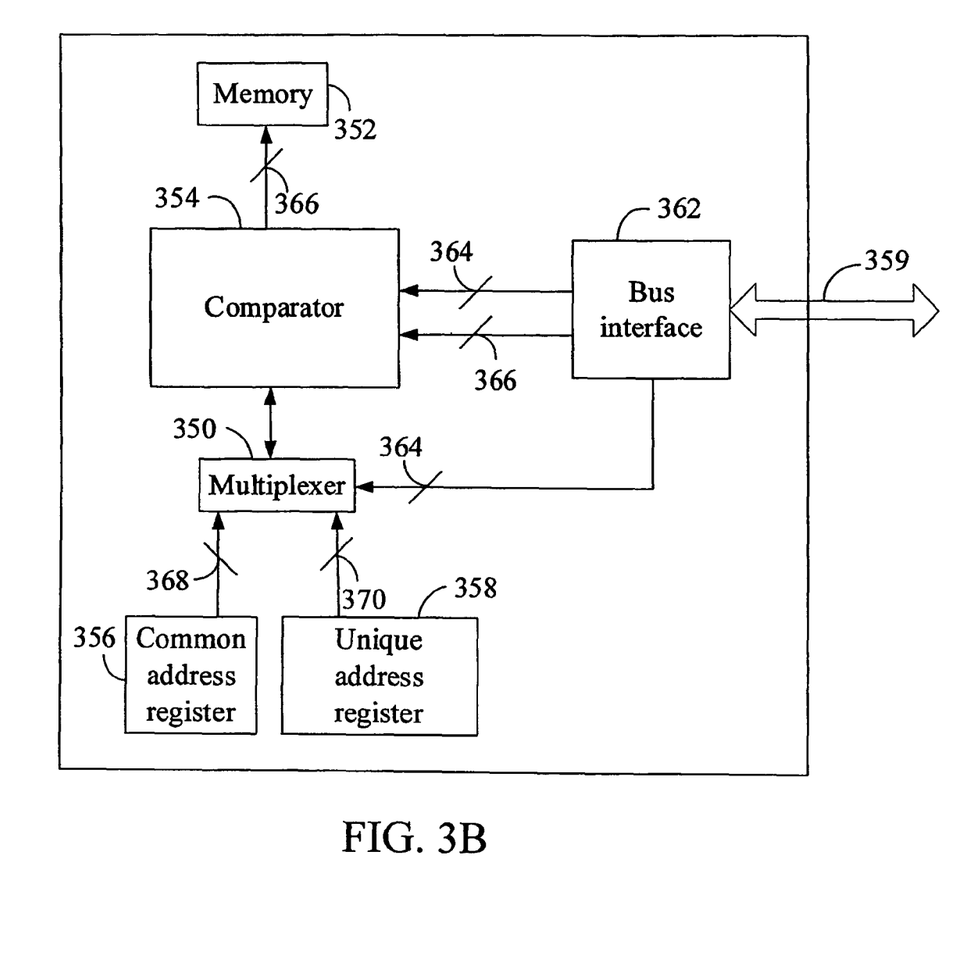
FIG. 3B is a schematic diagram of a demodulator of the first embodiment.

As illustrated in FIG. 3B, each of the demodulators 351, 353, and 357 comprises a multiplexer 350, a memory 352, a comparator 354, a common address register 356, a unique address register 358, and a bus interface 362. For illustration purpose, the memory 352 is an SRAM (Static RAM). The common address register 356 stores a common address code 368. That is, the common address register 356 for each of the demodulators 35 stores the same address code, i.e., the common address code 368. The unique address register 358 stores a unique address code 370. That is, each of the demodulators 35 has a different unique address code. When firmware loading begins, the processor 37 sets a device address code 364 as the common address code, and retrieves the firmware 366 from the memory 39 (e.g. the flash memory). The demodulators 35 receive the device address code 364 and the firmware 366 via the bus 359 and the bus interface 362. The device address code 364 and the firmware 366 are transmitted to the comparator 354. The processor 37 also sends a selection signal 372 to the multiplexer 350. The multiplexer 350 outputs the common address code 368, stored in the common address register 356, to the comparator 354 according to the selection signal 372. The comparator 354 compares the device address code 364 and the address code from the multiplexer 350. Since the address code from the multiplexer 350 matches the device address code 364, the comparator 354 allows storage of the firmware 366 in the memory 352. With the aforementioned process of firmware loading, all of the demodulators 35 load the firmware 366 simultaneously thereby.

After firmware is completely loaded, the processor 37 re-sends the selections signal 372 with a different value. The multiplexers 350 of the demodulators 35 output unique address codes 370 to the comparators 354. The communication between the processor 37 and the demodulators 35 is then based on the unique address codes.

It is unnecessary to set the addresses of all of the demodulators 35 to the common address code if only some of them require firmware loading. For example, if only the first demodulator 351 and the second demodulator 353 require firmware loading, the addresses of the first demodulator 351 and the second demodulator 353 are set to the common address code, while the address of the third demodulator 357 remains as its unique address code. Therefore, only the first demodulator 351 and the second demodulator 353 would perform the aforementioned firmware loading.

Figure 3C:
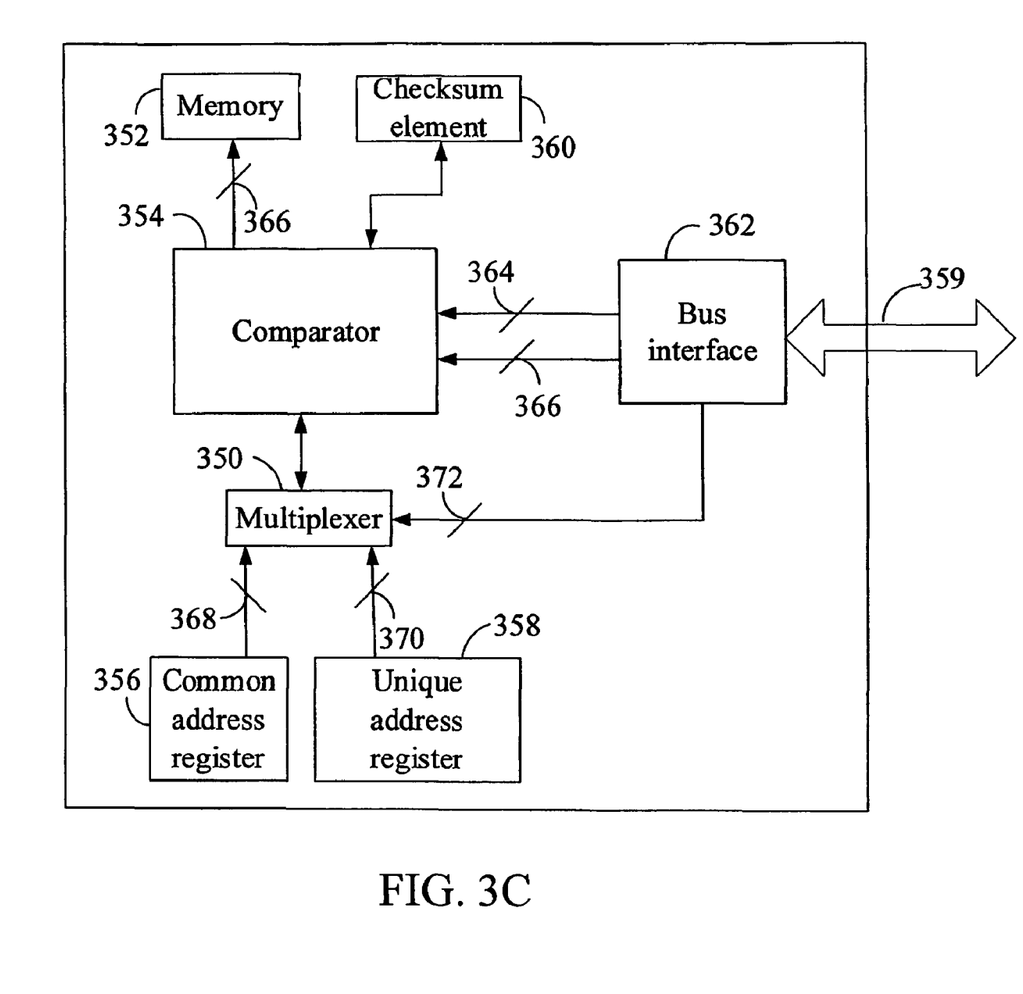
FIG. 3C is a schematic diagram of another demodulator of the first embodiment.

The demodulators 35 may have another structure as shown in FIG. 3C. In contrast with the structure shown in the FIG. 3B, the demodulators 35 further comprise a checksum element 360, while the firmware 366 comprises a checksum bit. When the firmware 366 is stored to the memory 358, the checksum element 360 checks a checksum of the firmware 366 with the checksum bit. If the checksum element 360 determines the checksum to be erroneous, the firmware 366 is problematic and should not be used. Under such circumstances, the processor 37 re-transmits the firmware 366. If the re-transmission of the firmware operates on the same demodulator for a particular number of times, such as five times, the processor 37 would disable this demodulator. In other words, the wireless communication system 3 demodulates receiving signals simply via the other demodulators. The processor 37 then decodes the demodulated signal.

Figure 4:
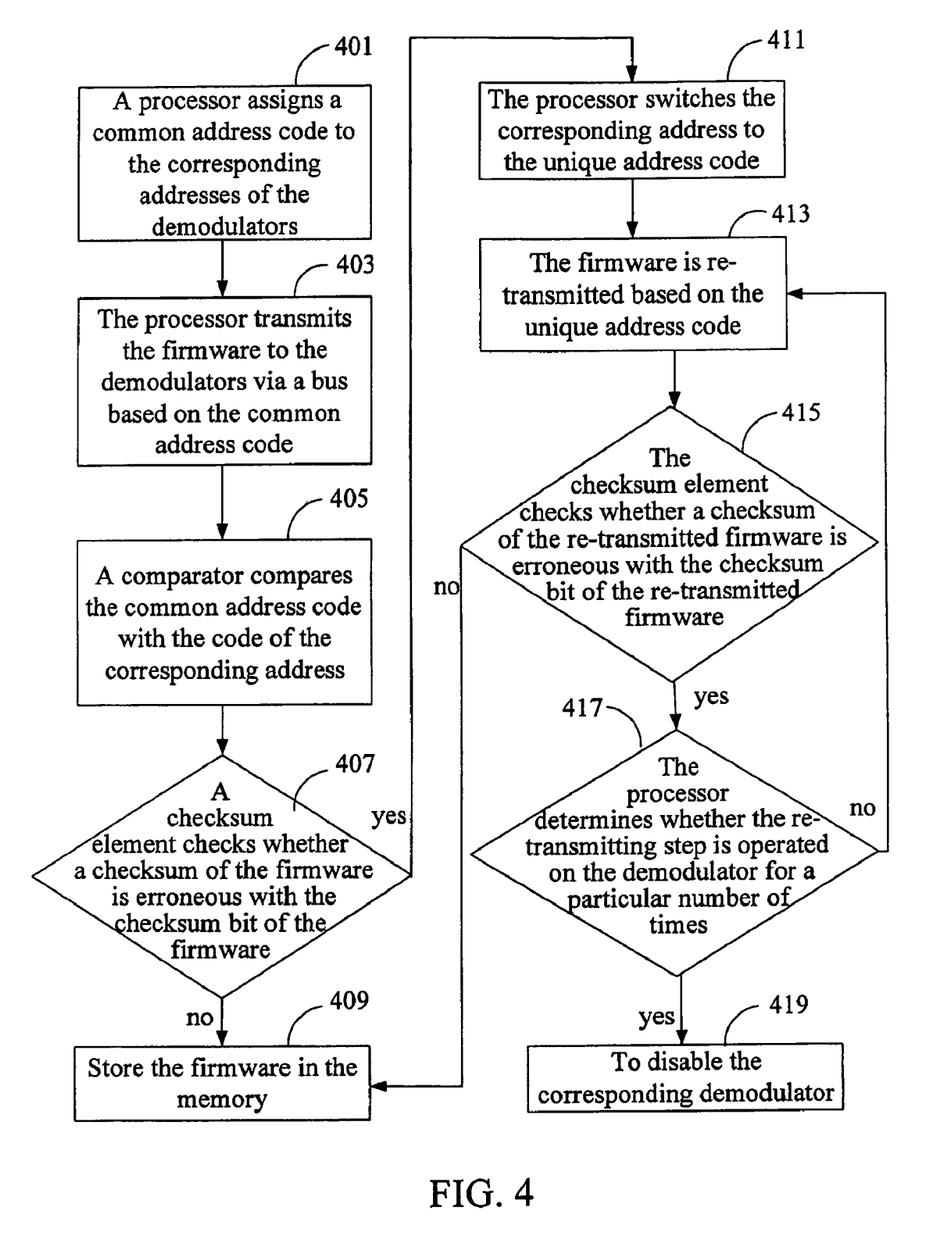
FIG. 4 is a flow chart of a second embodiment in accordance with the present invention.

FIG. 4 illustrates a flow chart to illustrate a method for loading firmware into a plurality of receiver ends, such as the demodulators of the wireless communication system in the exemplary embodiment as illustrated in FIG. 3. In step 401, a processor assigns a common address code to the corresponding addresses of the demodulators. In step 403, the processor transmits the firmware to the demodulators via a bus based on the common address code. Then step 405 is executed in which a comparator compares the common address code with the code of the corresponding address. Of course, the method as illustrated in FIG. 4 should not be limited only to one embodiment; instead, this method should be utilized by all who have ordinary skill in the relevant field.

If the common address code matches the code of the corresponding address, the method proceeds to step 407 in which a checksum element checks whether the checksum of the firmware is erroneous with the checksum bit of the firmware. If the checksum matches, step 409 is executed to store the firmware in the memory. However, if the checksum is erroneous, step 411 is executed in which the processor switches the corresponding address into the unique address code. In step 413, the firmware is re-transmitted based on the unique address code. Then, step 415 is executed in which the checksum element checks whether the checksum of the re-transmitted firmware is erroneous.

If the firmware still appears to be erroneous, the processor determines whether the re-transmitting step is operated on the demodulator for a particular number of times, such as 5 times, in step 417. If re-transmitting is still less than a particular number of times, the method goes back to step 413. If the re-transmitting step is already operated for the particular number of times, the method goes to step 419 to disable the corresponding demodulator. If the checksum matches in step 415, the method proceeds to step 409 for firmware storage. If the common address code does not match the code of the corresponding address in step 405, the method proceeds to step 421 to ignore the firmware.

In addition, the method as shown in FIG. 4 may also perform all of the operations and functions recited in the system as illustrated in FIG. 3. Those skilled in the art are able to realize how the method as shown in FIG. 4 to be utilized for performing these operations and functions based on the above descriptions of the first exemplary embodiment. For brevity, the descriptions for these operations and functions do not repeat herein.

Accordingly, the present invention sets the same address to a plurality of the receiver ends during firmware loading so that the firmware load time can be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication receiver, comprising:
   a bus;
   a plurality of receiver ends, each of the receiver ends having a corresponding address and storing a common address code and a unique address code; and
   a processor, setting the device address code as the common address code, transmitting firmware with the device address code and a selection signal to at least part of the receiver ends via the bus when the part of the receiver ends needs to load the firmware, the selection signal making the part of the receiver ends assign the common address code to the corresponding addresses of the part of the receiver ends;
   wherein the processor further transmits another selection signal to make the part of the receiver ends assign the unique address code in place of the common address code to the corresponding addresses of the part of the receiver ends after the firmware is loaded.

2. The wireless communication receiver as claimed in claim 1, wherein each of the receiver ends comprises a multiplexer for switching between the common address code and the unique address code.

3. The wireless communication receiver as claimed in claim 1, wherein each of the receiver ends comprises:
   a memory; and
   a comparator for comparing the device address code transmitted from the processor with the code of the corresponding address;
   wherein the firmware is allowed to be stored in the memory if the device address code matches the code of the corresponding address.

4. The wireless communication receiver as claimed in claim 1, wherein the firmware comprises a checksum bit, each of the receiver ends comprises a checksum element for checking a checksum of the firmware with the checksum bit, and the processor re-transmits the firmware if the checksum element determines the checksum is erroneous.

5. The wireless communication receiver as claimed in claim 4, wherein the processor disables one of the parts of the receiver ends if the re-transmitting operates on the receiver end for a particular number of times.

6. The wireless communication receiver as claimed in claim 1, wherein the bus is an I²C bus.

7. The wireless communication receiver as claimed in claim 1, wherein the processor is a decoder.

8. The wireless communication receiver as claimed in claim 1, wherein the receiver ends are demodulators.

9. A method for loading firmware to a plurality of receiver ends, each of the receiver ends having a corresponding address and storing a common address code and a unique address code, the method comprising:
   setting a device address code as the common address code;
   transmitting a selection signal to the receiver ends via a bus to make the corresponding addresses of the receiver ends assign the common address code to the corresponding addresses of the receiver ends;
   transmitting the firmware with the device address code to the receiver ends via the bus; and
   transmitting another selection signal to the receiver ends to make the receiver ends assign the unique address codes in place of the common address code to the corresponding addresses of the receiver ends after the firmware is loaded.

10. The method as claimed in claim 9, wherein the switching step between the common address code and the unique address code is executed by a multiplexer.

11. The method as claimed in claim 9, further comprising the steps of:
    comparing the device address code with the code of the corresponding address; and
    storing the firmware if the device address code matches the code of the corresponding address.

12. The method as claimed in claim 9, wherein the firmware comprises a checksum bit, and further comprising the steps of
    checking a checksum of the firmware with the checksum bit; and
    re-transmitting the firmware if the checksum is erroneous.

13. The method as claimed in claim 12, further comprises the steps of:
    disabling one of the receiver ends if the re-transmitting step is operated on the receiver end for a particular number of times.

14. The method as claimed in claim 9, wherein the bus is an I²C bus.

15. The method as claimed in claim 9, wherein the transmitting step is executed by is a decoder.

16. The method as claimed in claim 9, wherein the receiver ends are demodulators.

17. A wireless communication system, comprising:
    a plurality of antennas;
    a plurality of tuners, each of the tuners being connected to one of the antennas;
    a plurality of receiver ends, each of the receiver ends being connected to one of the tuners and having a corresponding address, and each of the receiver ends storing a common address code and a unique address code;
    a bus; and
    a processor, setting a device address code as the common address code, transmitting firmware with the device address code and a selection signal to at least part of the receiver ends via the bus when the part of the receiver ends needs to load firmware, the selection signal making the part of the receiver ends assign the common address code to the corresponding addresses of the part of the receiver ends;
    wherein the processor further transmits another selection signal to make the part of the receiver ends assign the unique address code in place of the common address code to the corresponding addresses of the part of the receiver ends after the firmware is loaded.

18. A wireless communication receiver, comprising:

means for transferring data;

a plurality of receiving devices for receiving wireless signals, each of the plurality of receiving devices having a corresponding address and storing a common address code and a unique address code;

means for transmitting firmware with a device address code and a selection signal to the part of the plurality of receiving devices via the transferring means; and a processor, setting the device address code as the common address code, transmitting the firmware with the device address code and the selection signal to at least part of the receiver ends via the transferring means by the transmitting means when the part of the receiver ends needs to load the firmware, the selection signal making the part of the receiver ends assign the common address code to the corresponding addresses of the part of the receiver ends; and wherein the processor further transmits another selection signal to the part of the plurality of receiving devices via the transferring means by the transmitting means, the another selection signal makes the part of the plurality of receiving devices assign the unique address codes in place of the common address code to the corresponding addresses of the part of the plurality of receiving devices after the firmware is loaded.

* * * * *